(12) United States Patent
Tada et al.

(10) Patent No.: US 7,114,307 B2
(45) Date of Patent: Oct. 3, 2006

(54) FILLING AND PACKAGING MACHINE

(76) Inventors: Toshio Tada, c/o Nippon Seiki Co.,Ltd., 2-2-34 Higashi Zaoh, Nagaoka, Niigata (JP); Tohru Hirasawa, c/o Nippon Seiki Co.,Ltd., 2-2-34 Higashi Zaou, Nagaoka, Niigata (JP)

( * ) Notice: Subject to any disclaimer, the term of this patent is extended or adjusted under 35 U.S.C. 154(b) by 0 days.

(21) Appl. No.: 10/531,920

(22) PCT Filed: Oct. 14, 2003

(86) PCT No.: PCT/JP03/13150

§ 371 (c)(1),
(2), (4) Date: Apr. 19, 2005

(87) PCT Pub. No.: WO2004/039674

PCT Pub. Date: May 13, 2004

(65) Prior Publication Data

US 2006/0021300 A1    Feb. 2, 2006

(30) Foreign Application Priority Data

Oct. 30, 2002  (JP) .............................. 2002-315466

(51) Int. Cl.
*B65B 9/20* (2006.01)
(52) U.S. Cl. ............................ 53/141; 53/550; 53/551; 493/193
(58) Field of Classification Search ................... 53/141
See application file for complete search history.

(56) References Cited

U.S. PATENT DOCUMENTS

| | | | | |
|---|---|---|---|---|
| 2,653,432 A | * | 9/1953 | Wright et al. ............... | 53/135.3 |
| 3,063,211 A | * | 11/1962 | Graves ......................... | 53/167 |
| 5,459,983 A | * | 10/1995 | Sadek et al. ................... | 53/560 |
| 5,848,517 A | * | 12/1998 | Yamamoto et al. ........... | 53/551 |
| 6,332,305 B1 | * | 12/2001 | Takahashi .................... | 53/551 |
| 6,598,377 B1 | * | 7/2003 | Takahashi .................... | 53/550 |

FOREIGN PATENT DOCUMENTS

| | | |
|---|---|---|
| JP | 06-037101 | 2/1994 |
| JP | 09-012002 | 1/1997 |
| JP | 2001-072019 | 3/2001 |
| JP | 2001-315708 | 11/2001 |
| JP | 2002-104310 | 4/2002 |

* cited by examiner

*Primary Examiner*—John Sipos

(57) ABSTRACT

A filling and packaging machine capable of supplementing the shortage of heat quality without lowering package speed when a film is heat-sealed while being pressurized by a vertical sealing mechanism, comprising a film folding mechanism having an inner surface guide member for guiding the film laterally, formed on the inner surface side of the film folded up into two parts, a pair of right and left pre-heating block members having tilted support surfaces or are support surfaces formed along the width-direction of the film on the outer surface side of the film through a specified interval from the inner surface guide member so that the interval on the upstream side of the film in feeding direction is larger than the interval on the downstream side, and heaters installed in the pre-heating block members.

8 Claims, 11 Drawing Sheets

FILLING AND PACKAGING MACHINE

TECHNICAL FIELD

The present invention relates to a filling and packaging machine adapted to heat seal vertically and laterally three or four sides of a continuously transferred packaging film, and thereby sealing up a material to be packaged, such as a liquid, powder or a viscous material.

BACKGROUND ART

A packaging bag into which a material to be packaged, for example, a liquid, powder or a viscous material is filled, the resultant bag being then sealed up has heretofore been formed generally by sealing vertically and laterally three or four sides of a packaging film made of packaging material, such as a film of a synthetic resin or a laminate formed by bonding the same film of a synthetic resin as mentioned above and aluminum foil together.

As an example of a machine for obtaining such a packaging bag, a filling and packaging machine for making three-side-sealed packaging bags will be described by using FIG. 10 and FIG. 11. Referring to the same drawings, a retainer frame 2 is provided at one side of a machine base 1 of the filling and packaging machine, and a raw film roll R made of a rolled film F mounted on this retainer frame 2 is detachably and replaceably retained on the retainer frame 2. On an upper portion of the machine base 1, a film guide mechanism 3 and a film folding mechanism 4 are provided. On a front side portion of the machine base 1, a vertical sealing mechanism 5, a lateral sealing mechanism 6 and a cutter mechanism 7 are provided in the mentioned order from the upper side. The packaging film F is introduced via the film guide mechanism 3 onto the film folding mechanism 4. The film F is folded vertically in two by the film folding mechanism 4. The resultant film is fed as the film F while being held between left and right vertical seal rolls 5A provided in the heated vertical sealing mechanism 5. The film F is heat sealed with the vertical sealing rolls 5A so that the film F is cylindrically and vertically sealed FH. The film F is then heat sealed laterally with left and right lateral seal rolls 6A provided in the heated lateral seal mechanism 6 so that the film F is laterally sealed FS. Owing to this lateral sealing FS, a bottom portion constituting a packaging bag P is formed. Into a bottomed cylindrical film F thus formed, a material M to be packaged made of a liquid and the like is filled by, for example, a filling nozzle 8A of a filling mechanism 8. The film F is further fed and laterally sealed FS again at a bag-mouth portion of the film F with the lateral seal rolls 6A of the lateral sealing mechanism 6, the material W to be packaged being thereby sealed to form continuous packaged bags P. Intermediate portions of the laterally sealed FS zones of the continuous packaged bags P are cut with a cutter mechanism 7, and the packaged bags P are sent out in an individually separated state. A filling and packaging machine thus formed is known.

In the case of this machine, the above-mentioned lateral sealing mechanism 6 includes two pairs of sealing rolls, i.e. lateral sealing rolls 6A of the first lateral sealing mechanism 6 and those 6A of the second lateral sealing mechanism 6 provided in a vertically separated state. The material W to be packaged filled into the film F fed as the film F is formed into a cylindrical bag by the filling nozzle 8A of the vertical filling mechanism 8 is heat sealed laterally FS with the two lateral sealing rolls 6A, which are provided in the first lateral sealing mechanism 6, as the material W is forced out with the film F pressed in a sandwiched state by these lateral seal rolls. The portion FS laterally heat sealed with the lateral sealing rolls 6A of the first lateral seal mechanism 6 is pressed again by the lateral sealing rolls 6A of the second lateral sealing mechanism 6 in a low-temperature overheated condition or in a normal temperature condition so as to keep excellent the sealed condition of the laterally sealed FS portion.

In the above-described related art filling and packaging machine, the film F is fed as the film is heat sealed with a pair of vertical sealing rolls 5A of the vertical sealing mechanism 5. When a rotational speed of the two vertical sealing rolls 5A provided in the vertical sealing mechanism 5 is low, the contact time of the vertical sealing rolls 5A and film F becomes long, so that the heat of the vertical sealing rolls 5A is transmitted in a proper condition to a thermally fusible resin layer of the film F, which is then thermally melted. Therefore, the heat is transmitted in a proper condition to the vertical sealing FH portion of the film F, which is thereby melted. Accordingly, the proper heat sealing can be carried out on the vertical sealing FH portion of the film F. Since the region of the film F held between, pressurized by, and heat sealed with a pair of vertical sealing rolls 5A becomes a narrower region Ti as shown in a schematic diagram of FIG. 11, in inverse proportion to the transfer speed of the film F since the region of the film F held between and heated with the two vertical sealing rolls 5A is disposed in a plane in which the circular vertical sealing rolls 5A are positioned in an abutted state with respect to the film F. As a result, a shortage of the quantity of heat occurs in the portion of the film F which is on the forward side thereof with respect to the direction of the rotation thereof and in the portion of the film F which is on the rearward side thereof with respect to the same direction, and imperfect heat sealing occurs in some cases in the vertical sealing FH portion contacting these two portions.

Under the circumstances, a filling and packaging machine, in which these points are taken into consideration has been proposed [refer to, for example, JP-A-2001-72019 (Publication 3 to 4 pages, FIG. 1 and FIG. 2)] which is provided with a preheating mechanism 11 between the upper side of a vertical sealing mechanism 5, i.e. a film folding mechanism 4 on the upstream side in the transfer direction of a film F and the vertical sealing mechanism 5, the preheating mechanism 9 being positioned between both edges of the film F folded in two, to preheat end portions of both edges of the film F, for the purpose of making up for the shortage of the quantity of heat occurring while the film is heat sealed as the film is pressurized by the vertical sealing mechanism 5.

However, the means for preheating the film F, which is made of a preheating mechanism 11 provided in the related art filling and packaging machines including that disclosed in JP-A-2001-72019 employs a structure for heating the film F by bringing the edge portions only of the folded film F into contact with the preheating mechanism 9. Therefore, contact regions with respect to the preheating mechanism 9 are small, so that the film F is partially heated. In consequence, the heat of the heated portions propagates and escapes to the surrounding portions of the film F, so that it cannot be said that the preheating effect is excellent. This poses a problem of necessarily setting high the preheating temperature of the preheating mechanism 11, and there is also the possibility that a fused layer on the inner side of the film F is melted and damages the film F. This phenomenon would occur noticeably in the structure disclosed in JP-A-2001-72019 in which a preheating mechanism is provided on the inner side of a film to be folded.

Other conceivable preheating means include a preheating means in which heaters are contained, for example, in rollers for feeding the film F, and the film is fed out as the film F is held tightly between the heated rollers or as predetermined tension is exerted thereon. Thus, the film F heated with the preheating means made of rollers is sent into the film folding mechanism and folded in two, and the film F is then sent into a vertical sealing mechanism. When the heated film F is sent into the film folding mechanism, friction is liable to occur between a guide of the film folding mechanism and film F, though the degree of the friction differs depending upon the kind of the material of the film F. There is the possibility that the film F meanders due to an increase in the level of the friction.

As filling and packaging machines formed with these points taken into consideration, the applicant of the present invention has proposed filling and packaging machines in which a preheating means is added to a film folding mechanism disclosed in, for example, JP-A-2002-104310 etc.

In the filling and packaging machine disclosed in JP-A-2002-104310 etc., the film is preheated in the widthwise direction thereof, so that the film as a whole folded in two is fed out as the film is heated. Therefore, the film is sent in a preheated state while maintaining the non-heat-losing effect to a vertical sealing point in which a subsequent step is started. This solves the problems encountered in the above-mentioned related art (JP-A-2001-72019) filling and packaging machine. However, since it is generally necessary to introduce the film from the upper guide rolls while folding up the film in two so that the film is squeezed, the preheating means for pressing the film from the outside tends to tangentially contact in the widthwise direction. In the invention disclosed in JP-A-2002-104310, the film as a whole is preheated in the widthwise direction thereof. Therefore, when the film feeding speed is comparatively low, the heat is transmitted comparatively well to the film, and a good preheated condition of the film can be maintained. A heat transfer rate tends to lower in inverse proportion to the film feeding speed, and, therefore, it is conceivable that a shortage of the quantity of heat is brought about due to the film preheating operation.

Under the circumstances, the present invention aims at providing a filling and packaging machine formed with attention paid to these problems, and capable of making up for a shortage of the quantity of heat occurring when a film is heat sealed as the film is pressurized by a vertical sealing mechanism without causing a packaging rate to lower.

DISCLOSURE OF THE INVENTION

The present invention relates to a filling and packaging machine adapted to continuously form packaging bags from a film and continuously packaging a material in the bags by carrying out the steps of drawing out and guiding a film from a raw film roll made of a wound film; sending this film to a film folding mechanism adapted to fold back the film in two in the widthwise direction; superposing the two parts of the folded film on each other, vertically sealing the film by a pair of vertically sealing rolls provided in an opposed manner in a vertical sealing mechanism and forming the film cylindrically at this vertically sealed portion; laterally sealing the cylindrically formed film by a pair of laterally sealing rolls provided in a laterally sealing mechanism, and forming a bottom portion of a packaging bag at this laterally sealed portion; filling a material into the film formed to a bottomed cylinder at this bottom portion; and laterally sealing a bag mouth portion of the film as the film is further fed, by the laterally sealing rolls of the laterally sealing mechanism to form a packaged bag and thereby carrying out a continuous packaging operation, wherein the film folding mechanism is provided with an inner surface guide member, which is adapted to guide the film in the widthwise direction thereof, on the side of inner surfaces of the twofold film, left and right preheating block members which are disposed on the side of outer surfaces of the film via clearances of a predetermined width left therebetween so that the preheating block members extend in the widthwise direction of the film, and which have inclined receiving surfaces or arcuate receiving surfaces so that the clearances between the film and preheating block members at an upstream side with respect to the film transfer direction become larger than those between the film and preheating block members at a downstream side with respect to the same direction, and heaters provided in the interior of the preheating block members, the two heater-containing preheating block members provided in the film folding mechanism and having inclined receiving surfaces or arcuate surfaces so that the clearances between the film and preheating block members at an upstream side with respect to the film transfer direction become larger than those between the film and preheating block members at a downstream side with respect to the same direction sending out the twofold film while holding the film tightly between the block members and pressurizing the same at the outer surface thereof in the widthwise direction of the film. Since the parts are arranged in this manner, the contact surface area of the film with respect to the two preheating block members can be increased, so that the film can be preheated as the heat transfer rate of the block members with respect thereto is rendered high. Since the film is sent out as a predetermined contact pressure thereof with respect to the preheating block members is maintained, the film can be heated in advance in a stable condition. Moreover, when the film is vertically sealed in a subsequent step as the film is held between a pair of vertical sealing rolls, the heat is transmitted easily to the thermally fusible resin layer of the film, so that this layer can be melted excellently. Therefore, even when the transfer speed of the film is increased, the sealed condition of the vertically sealed portion can be kept excellent, and the imperfect heat sealing of the portion to be vertically sealed can be prevented. During this time, the film can be preheated by utilizing a part of the film folding mechanism, which is adapted to fold the film in two, also as a preheater, and this enables the number of parts to be added to be reduced to as great an extent as possible.

The two preheating block members are provided so that the angle of fixing the same can be finely regulated. Therefore, when the film is drawn out and guided from a raw roll made of a wound roll, and then pulled round and guided so that the film is drawn as the film is folded in two in the widthwise direction thereof, the fixing angle of the inclined receiving surfaces or arcuate receiving surfaces of the preheating block members are set by finely regulating the same substantially in accordance with the drawing angles of both end portions of the film. As a result, the fixing angle of the preheating block members can be set in the film feeding direction. This makes it possible to maintain the contact surface area of the film with respect to the inclined surfaces or arcuate surfaces of the two preheating block members at a sufficiently high level, preheat the film while maintaining the heat transfer rate with respect thereto, transmit the heat to the thermally fusible resin layer of the film easily, which is thereby melted excellently while the vertical sealing of the film is done with the film held tightly between the vertical sealing rolls in, for example, a subsequent step, and maintain the sealing strength of the vertically sealed portion in a heightened condition.

Since the positions in which the two preheating block members are set can be regulated in the vertical direction, the positions in which the inclined receiving surfaces or arcuate receiving surfaces can be set while vertically regulating the positions in which the inclined receiving surfaces or arcuate receiving surfaces of the preheating block members are fixed in accordance with, for example, the positions in which the vertically sealing rolls are fixed and the position etc. of the twofold film. Therefore, when the film is vertically sealed as the film is held tightly between the vertical sealing rolls in the subsequent step, the preheating block members can be set so that the heat is transmitted easily to the thermally fusible resin layer of the film to cause the layer to be melted excellently, and the strength of the vertically sealed portion can be heightened.

The two preheating block members are provided so that the distance therebetween can be varied. Therefore, the film folded in two by the heater-containing preheating block members having inclined receiving surfaces or arcuate receiving surfaces and provided in the film folding mechanism can be sent out as the outer surface of the film is held tightly between the block members in the widthwise direction of the film, and in such a manner that the distance between the block members which is on the upstream side with respect to the transfer direction of the film becomes larger than that between the block members which is on the downstream side with respect to the same direction. Namely, since the preheating block members are provided so that the distance therebetween can be varied, the film can be sent out as the film is pressed with a predetermined pressing force with the contact surface area of the film with respect to the inclined receiving surfaces or arcuate receiving surfaces of the block members increased. As a result, when the vertical sealing of the film is done in the subsequent step as the two pairs of vertical sealing rolls hold the film tightly therebetween, the heat is transmitted easily to the thermally fusible resin layer, and this layer can be melted excellently. Even when the film transfer speed is increased, the condition of the vertically sealed portion can be kept excellent.

BEST MODE FOR CARRYING OUT THE INVENTION

Figure 1:
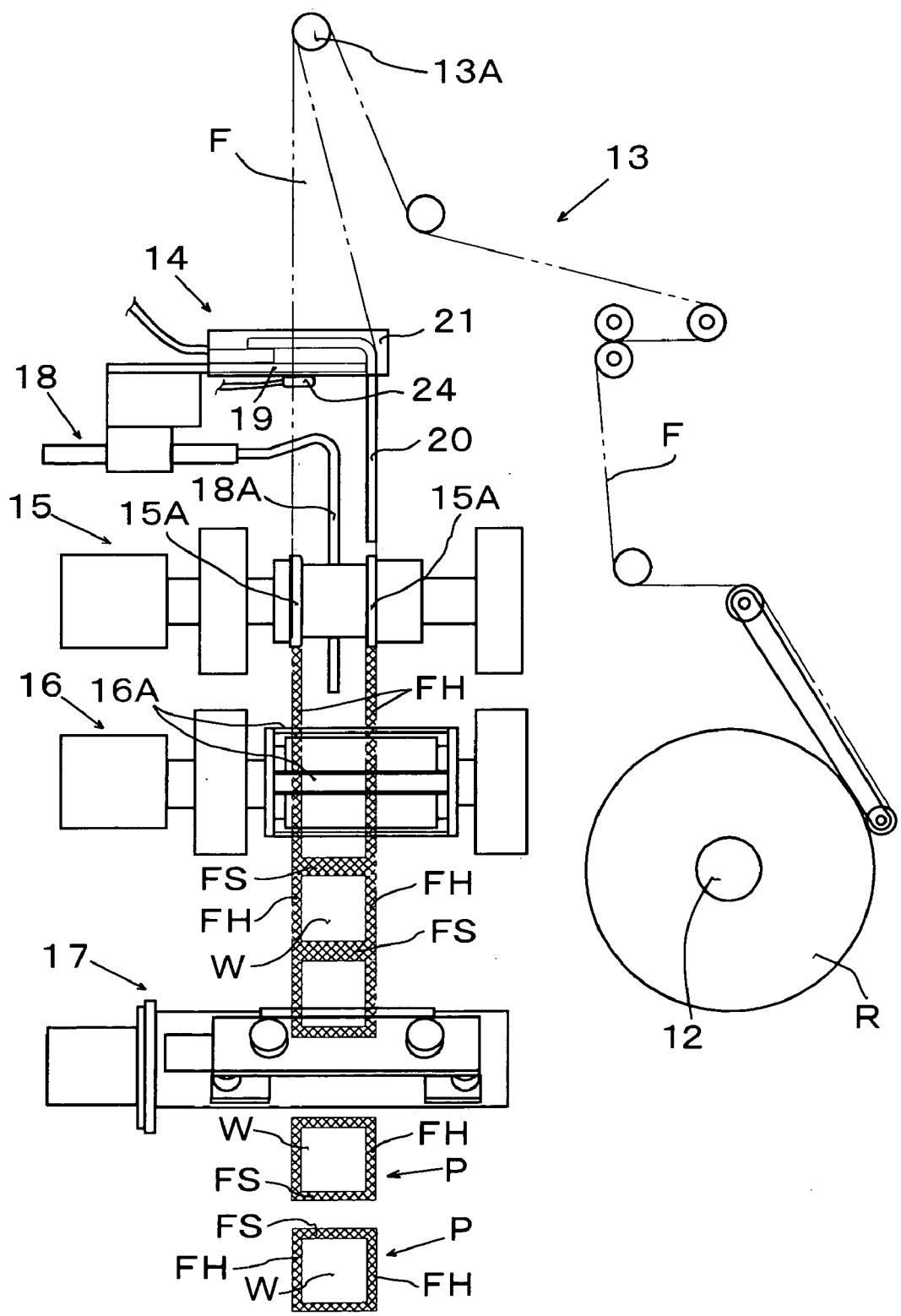
FIG. 1 is a general schematic front view of a filling and packaging machine showing a first embodiment of the present invention.
Figure 2:
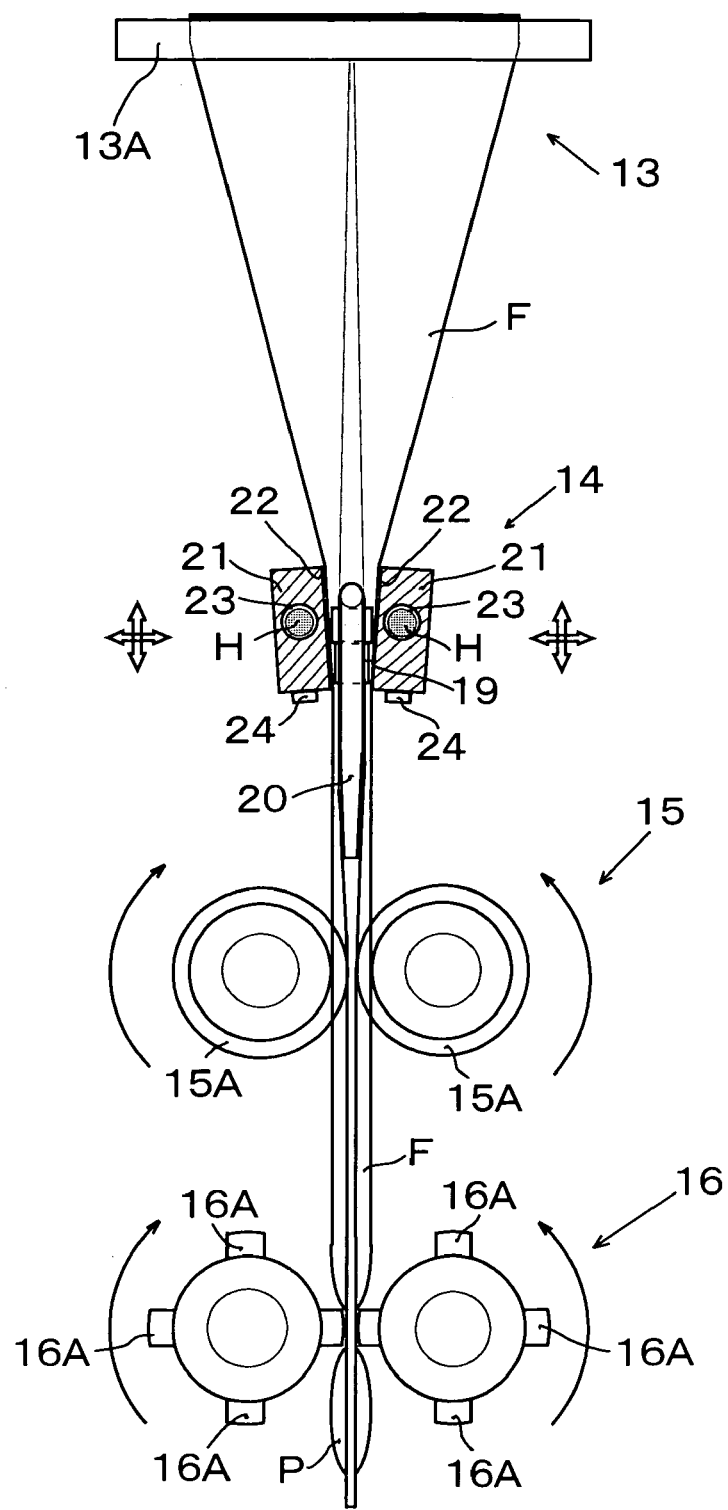
FIG. 2 is a side view of a principal portion of the embodiment, mainly a packaging film heat sealed with a film folding mechanism having preheaters of the filling and packaging machine of FIG. 1 and a vertically sealing mechanism.

The present invention will now be described more in detail with reference to the attached drawings. The general schematic construction and operation of a first embodiment of the filling and packaging machine according to the present invention will be described with reference to FIG. 1 to FIG. 4.

Referring to the same drawings showing the general schematic construction of the filling and packaging machine, a raw roll R of film made of a wound film F is mounted and supported on a retainer frame 12 provided on one side of a machine base of the filling and packaging machine. The film F withdrawn and guided from the raw film roll R receives a predetermined level of tension via a film guide mechanism 13 and is withdrawn and guided to a guide roll 13A provided above the machine base of the filling and packaging machine. The film F is then fed from the guide roll 13A to a film folding mechanism 14, which is provided on the lower side of the guide roll 13A, and folded in such a manner that the film F is put in a twofold state and withdrawn and guided downward.

In this embodiment, the twofold film F withdrawn and transferred downward is folded back in two by a pair of vertically sealing rolls 15A, 15A provided in left and right positions in a vertically sealing mechanism 15. The folded edge portion and folded end portion (left and right edge portions) of the resultant film F are heat sealed in the vertical direction. As a result, vertically sealed portions FH are formed on both end portions of film F, and the film F is then heat sealed with laterally sealing rolls 16A of a laterally sealing mechanism 16 provided below the vertically sealing mechanism 15. Thus, laterally sealed FS portions are formed, and four-side-sealed packaging bags P are continuously made.

In this embodiment, the film F is heat sealed with the two laterally sealing rolls 16A, 16A of the laterally sealing mechanism 16 at predetermined intervals in the lateral direction to form laterally sealed portions FS, by which a bottomed portion becoming a packaging bag P is formed. The material W is then filled from a filling nozzle 18A of a filling mechanism 18 into the bottomed cylindrical film F.

After the film F is then sent out, the portion of the film F which becomes a bag mouth portion is heat sealed with the laterally sealing rolls 16A, 16A of the laterally sealing mechanism. The material W packaged is sealed with the laterally sealed FS portion by this heat sealing operation.

This filling and packaging machine may also be formed as shown in the related art example. Namely, the above-mentioned laterally sealed FS portion is further pressurized and sealed by a pair of laterally sealing rolls provided in a second laterally sealing mechanism (not shown). Thus, the four sides of the film F are heat sealed, and the resultant packaging bags P are transferred downward successively in a continuously joined state.

Under the laterally sealing mechanism 16, a blade-carrying cutting mechanism 17 capable of cutting off a substantially intermediate section of the lateral sealed FS portion of the vertically joined packaged bags P, and sending out the separated bag is provided.

In this first embodiment, the film folding mechanism 14 for folding the film F in two is provided with an inner surface guide member 19 for guiding the film F along an inner surface of the twofold film F, and a guide shaft 20 at an end side of this inner surface guide member 19, which guide shaft 20 is adapted to guide the film F in the vertical direction of the folded portion of the twofold film F. On both sides of the inner surface guide member 19, left and right preheating block members 21 are provided so that the block members 21 are spaced from the guide member 19 at a predetermined distance respectively and contact outer side surface of the film F.

When, in this structure, the film F is withdrawn and guided from the upper guide roll 13A to the lower side by the film folding mechanism 14 so that the film F is folded in two in the vertical direction thereof, the film F is fed with the distance between both edge portions of the film F gradually decreasing toward the lower side. Therefore, the inner surfaces of the preheating block members 21 provided in the film folding mechanism 14 is made of inclined receiving surfaces 22 extending on the side of the outer surface of the film F in the widthwise direction thereof so that the distance between the inclined receiving surfaces 22 becomes smaller from the upstream side portion thereof with respect to the transfer direction of the film F toward the downstream side portion thereof with respect to the same direction. In other words, the film folding mechanism 14 is made of an inner surface guide member 19 which is provided on the side of the inner surface of the twofold film F, and which is adapted to guide the film F in the widthwise direction of the film F; and left and right preheating blocks 21 having inclined receiving surfaces 22 which extend on the side of the outer surface of the film F in the widthwise direction thereof via predetermined width of space with respect to this inner surface guide 19, and which are formed so that the distance between the portions of the inclined receiving surfaces 22 which are at the upstream side with respect to the transfer direction of the film F is larger than that between the portions of the inclined receiving surfaces 22 which are at the downstream side with respect the same direction.

The preheating block members 21 are provided with hollows 23 for containing heaters H therein. In these hollows 23, the heaters H are provided so that the heaters H can be moved and regulated therein. Temperature detecting sensors 24 for measuring the heating temperature of the heaters H are provided along outer surfaces of the preheating block members 21. These temperature detecting sensors 24 may be housed in the hollows 23, and heaters H formed so that the temperature detecting sensors 24 are provided on themselves may be employed in some cases.

Therefore, in the filling and packaging machine according to the present invention, the outer surface of the film F folded in two by the preheating block members 21 containing heaters H therein and provided in the film folding mechanism 14 is sent out as the film F is put in a pressurized state with the twofold film F held tightly from the outer side thereof. The film F can thereby be preheated with the rate of transfer of heat to the film F rendered high. Namely, the film F is sent out with the outer surface of the film F held tightly from the outer side between the inclined receiving surfaces 22 of the left and right preheating block members 21 which are disposed in the widthwise direction of the film F so that the distance between the block members decreases from the upstream side with respect to the transfer direction of the film F toward the downstream side with respect thereto with a predetermined contact pressure maintained and a posture of the film F corrected. Since the contact surface area of the inclined receiving surfaces 22 of the two preheating block members 21 and film F can be increased, the film F can be heated in advance in a stable condition.

When the film F as a whole is heated in advance in the widthwise direction thereof, the film can be fed as the preheating effect for the film F is heightened. Therefore, when the film F is vertically sealed FH in a subsequent step as the film F is held tightly between the two vertically sealing rolls 15A, 15A, the heat is transmitted easily to the thermally fusible resin layer forming an inner layer of the film F, so that this layer can be melted excellently. Even when the transfer speed of the film F is increased, the condition of the vertically sealed portion FH can be kept excellent, and the occurrence of imperfect vertical sealed portion FH can be prevented. During this time, the film F can be preheated by utilizing as a preheater a part of the film folding mechanism 14, which is adapted to fold back the film F, and this enables the number of parts to be added to be reduced to as great an extent possible.

The two preheating block members 21 in the first embodiment are provided so that the fixing angle thereof can be finely regulated. Therefore, when the film F is withdrawn and guided from the raw film roll R made of a wound film and then drawn round and guided as the film F is folded back in two in the widthwise direction thereof, the fixing angle of the inclined receiving surfaces 22 of the preheating block members 21 is finely regulated and set as the fixing angle is set substantially equal to the drawing angle of both ends of the film F. Thus, the fixing angle of the preheating block members 21 can be set in the feed direction of the film F. Therefore, the contact surface area of the inclined receiving surfaces 22 of the two preheating block members 21 and film F which contacts the inclined receiving surfaces can be kept sufficient, and the film F can be preheated with the rate of transfer of heat to the film F increasing. When the vertically sealing FH of the film F is done as the film F is held tightly between the vertically sealing rolls 15A in a subsequent step, the heat is easily transmitted to the thermally fusible resin layer of the film F, so that this layer can be melted excellently, and the sealing strength of the vertically sealed FH portion can be kept in a heightened state.

In the first embodiment, the two preheating block members 21 are provided so that the fixing positions thereof can be vertically regulated. Therefore, it is possible to set the position in which the inclined receiving surfaces 22 of the preheating block members 21 are fixed as this position is regulated in the vertical direction in accordance with, for example, the position set of the vertically sealing rolls 15A and that of the film F folded in two, and set the position of fixing the inclined surface mentioned above of the inclined receiving surfaces 22 so that the heat is easily transmitted to the thermally fusible resin layer of the film F to cause the layer to be melted excellently while the vertical sealing FH of the film F is done as the film F is held tightly between the vertically sealing rolls 15A in the subsequent step. This enables the sealing strength of the vertically sealed FH portion to be heightened.

The two preheating block members 21 constituting a principal portion of the film folding mechanism 14 in the first embodiment are provided so that the distance between the block members 21 can be regulated. Therefore, the twofold film F is sent out with the film F put in a pressurized state as the film F is held tightly at the outer surface thereof from the outside between the left and right preheating block members 21 containing heaters H therein, provided in the film folding mechanism 14 so as to extend in the widthwise direction of the film F, and having inclined receiving surfaces 22 so that the distance between the receiving surfaces at the upstream side with respect to the transfer direction of the film F is larger than that between the receiving surfaces at the downstream side with respect to the same direction. Since the two preheating block members 21 are provided so that the distance therebetween can be varied arbitrarily, it becomes possible to send out the film F while increasing the contact surface area of the inclined surfaces 22 and film F. As a result, when the vertically sealing FH of the film is done in the subsequent step as the vertically sealing rolls 15A hold the film F tightly therebetween, the heat is easily transmitted to the thermally fusible resin layer of the film F to cause the same layer to be melted excellently. Even when the transfer speed of the film F is increased, the condition of the portion vertically sealed can be kept excellent.

Figure 5:
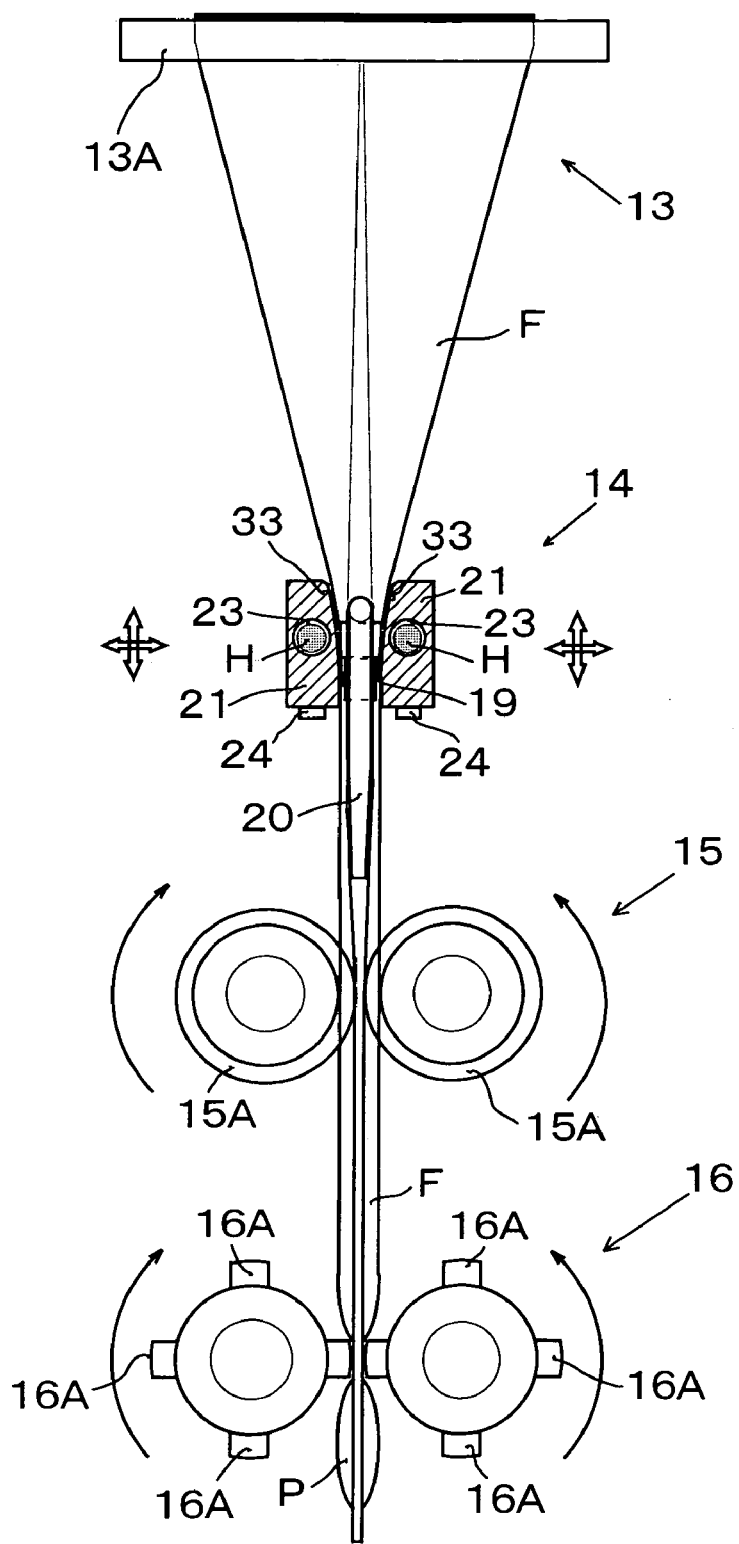
FIG. 5 is a side view showing a principal portion of a second embodiment of the filling and packaging machine of the present invention, mainly a packaging film being heat sealed with a film folding mechanism having preheaters and a vertically sealing mechanism.
Figure 6:
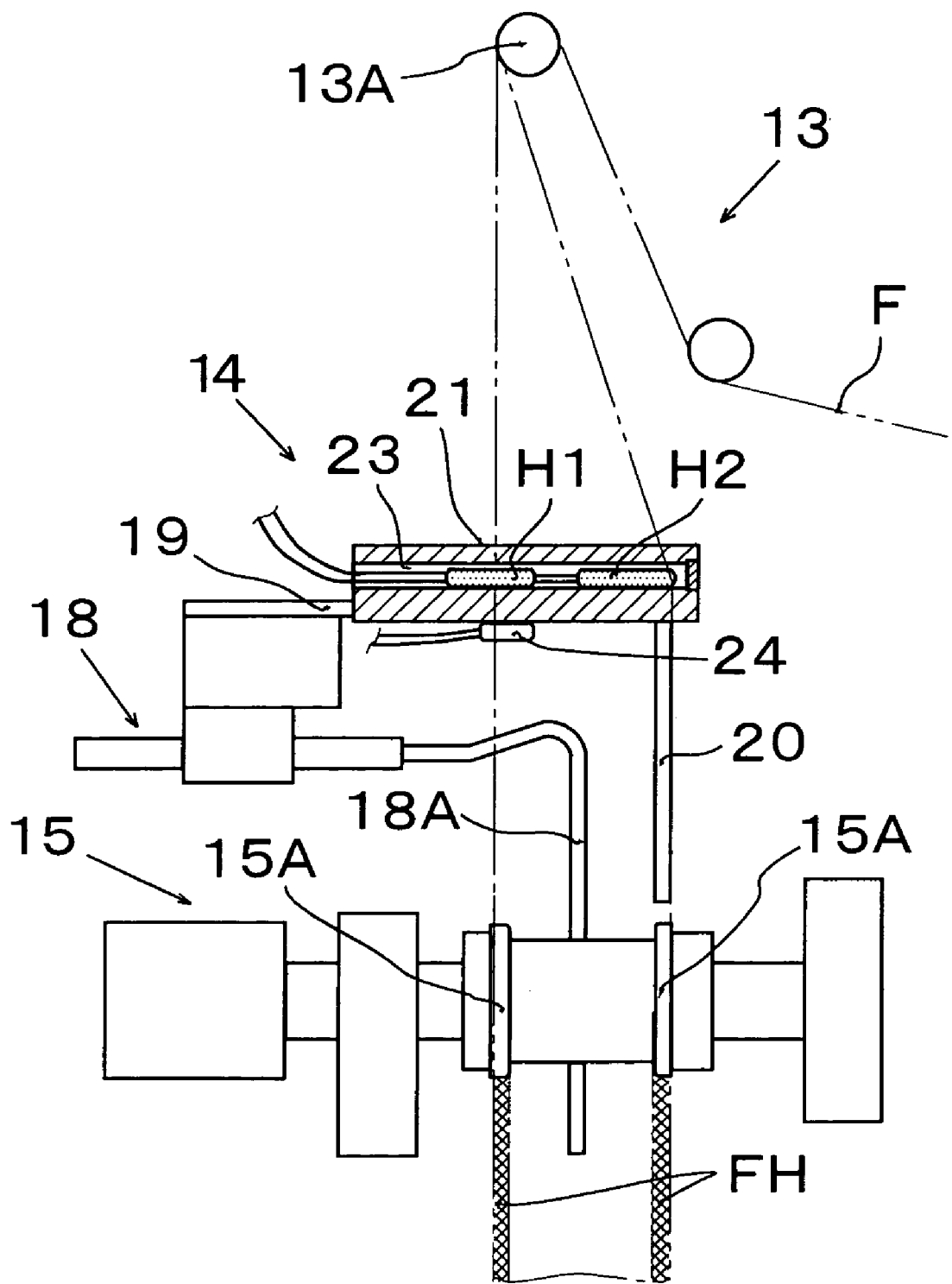
FIG. 6 is a front view showing in section the parts of the principal portions of the film folding mechanism having the preheaters of FIG. 5 and parts of the vertically sealing mechanism.

FIG. 5 and FIG. 6 show a second embodiment of the present invention, which is formed in a basic mode in substantially the same manner as the above-described first embodiment of the filling and packaging machine.

In this second embodiment, a film folding mechanism 14 is formed by providing at the inner surface side of a twofold film F with an inner surface guide member 19 adapted to guide the film F in the widthwise direction thereof; left and right preheating block members 21 which are provided on the outer surface side of the film F with a predetermined width of space formed between the inner surface guide member 19 and block members 21 so as to extend in the widthwise direction of the film F, and which have arcuate receiving surfaces 33 so that the distance between the receiving surfaces at the upstream side with respect to the transfer direction of the film is larger than that between the receiving surfaces at the downstream side with respect to the same direction; and hollows 23 provided in a portion of each of the preheating block members 21 so that the hollows 23 extend in the lengthwise direction of the block members 21, two heaters H1, H2 being contained in these hollows 23 so that each of the heaters H1, H2 can be regulated by moving the same, or in such a manner that one of the heaters can be regulated by moving the same.

In this second embodiment as well, the film folding mechanism 14 including the preheating block members 21 is formed so as to make it possible to vertically regulate the movement of the film folding mechanism, finely regulate the fixing angle of the two preheating block members 21, and change the distance between the preheating block members 21 constituting a principal portion of the film folding mechanism 14.

In this structure, the twofold film F is sent out in a pressurized state at the outer surface thereof and in the widthwise direction thereof by the preheating block members 21 containing heaters H (H11, H2) and provided in the film folding mechanism 14 as the film F is held tightly from the outside between the left and right preheating block members 21 having arcuate receiving surfaces 33 and provided so that the distance between the portions of the block members which are on the upstream side with respect to the transfer direction of the film F is larger than that of the portions thereof which are on the downstream side with respect to the same direction. Since the two preheating block members 21 are disposed in this manner, the contact surface area of the film F and arcuate receiving surfaces 33 of the preheating block members 21 can be increased. Therefore, the preheating operation can be carried out as the rate of transfer of the heat to the film F set high. As a result, the film F is sent out smoothly as the film F retains a predetermined contact pressure with respect to the preheating block members 21, and, moreover, along the arcuate receiving surfaces 33 of the preheating block members 21. This enables the film F to be heated in advance in the stable condition. When the film F is vertically sealed FH as the film F is held tightly between the pairs of vertically sealing rolls 15A, the heat is easily transmitted to the thermally fusible resin layer of the film F, and this layer can be melted excellently.

Therefore, even when the transfer speed of the film F is increased, the condition of the vertically sealed FH portion can be kept excellent, and imperfect sealing of the portion to be vertically sealed FH can be prevented. During this time, the film F can also be preheated by utilizing as a preheating means a part of the structure of the film folding mechanism 14 adapted to fold back the film F in two, and the number of parts to be added can be reduced effectively to as great an extent as possible.

The two preheating block members 21 are provided so that the fixing angle thereof can be regulated, and the film folding mechanism 14 including the preheating block members 21 is provided so that the movement of the film folding mechanism 14 can be regulated vertically. In addition, the preheating block members 21 are provided so that the distance therebetween can be varied. This makes it possible to regulate the position of the preheating blocks in accordance with the preheating condition without giving influence upon the feeding operation of the film F and obtain the same effect as that of the above-described first embodiment.

In the above-described embodiments, the film F folded back in two by the preheating function-carrying film folding mechanism 14 is fed to the left and right vertical sealing rolls 15A, 15A provided in the vertically sealing mechanism 15. The folded edge portion and folded end portion (left and right edge portions) of the film F folded in two are heat sealed in the vertical direction, so that the vertically sealed FH portions are formed at both end portions of the film F. In this case, the vertically sealed FH portions are set in accordance with the width of the twofold film F. Since it becomes possible to regulate the heating condition of the preheating block members 21 by moving in accordance with the vertically sealing FH positions the heaters H in the hollows 23 formed in the preheating block members 21, predetermined portions of the film F corresponding to the vertical sealing FH portions can be heat sealed locally as the heating temperature is increased.

Figure 3:
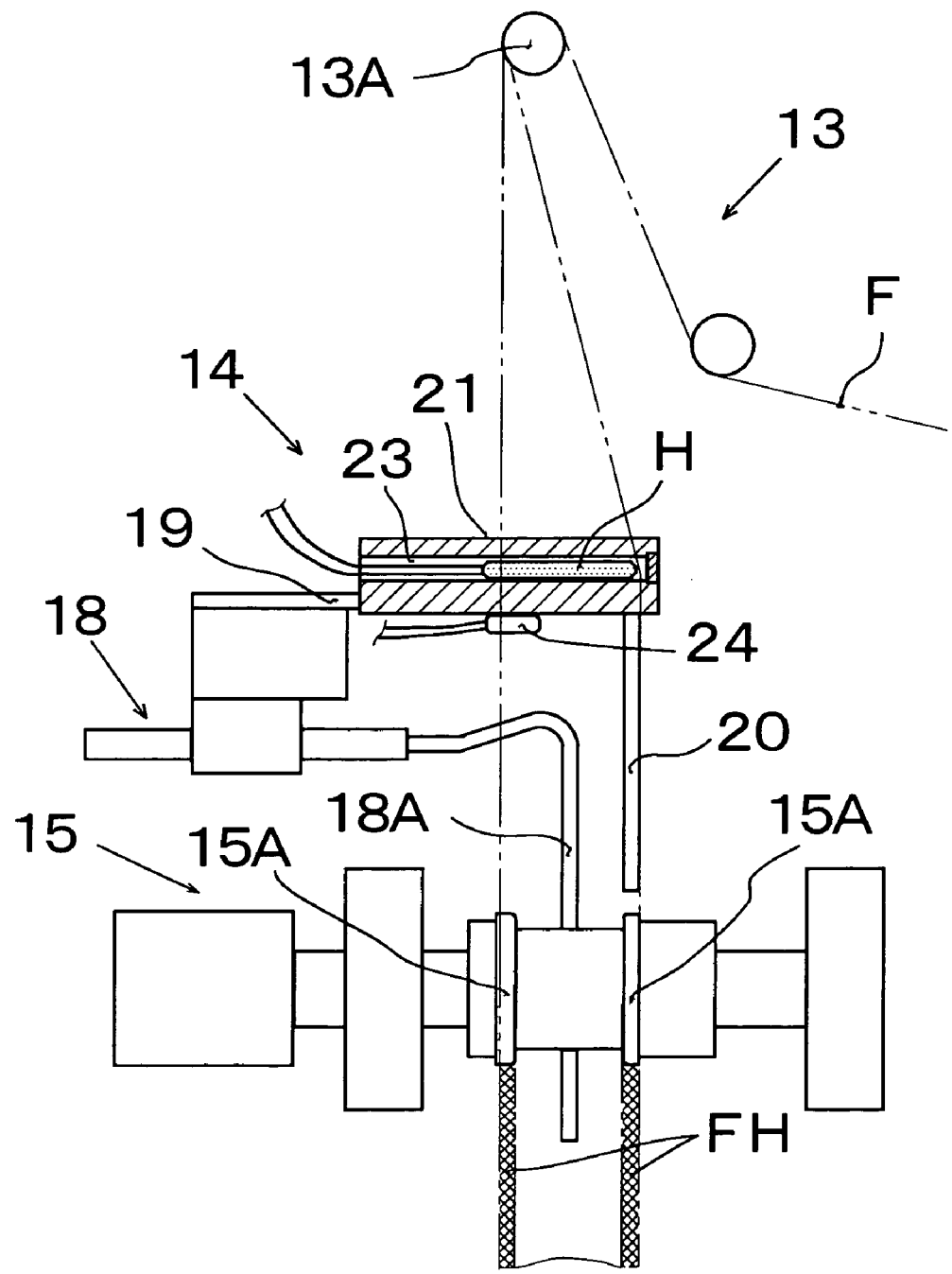
FIG. 3 is a front view showing in section parts of principal portions of the film folding mechanism having the preheaters of FIG. 1 and vertically sealing mechanism.
Figure 4:
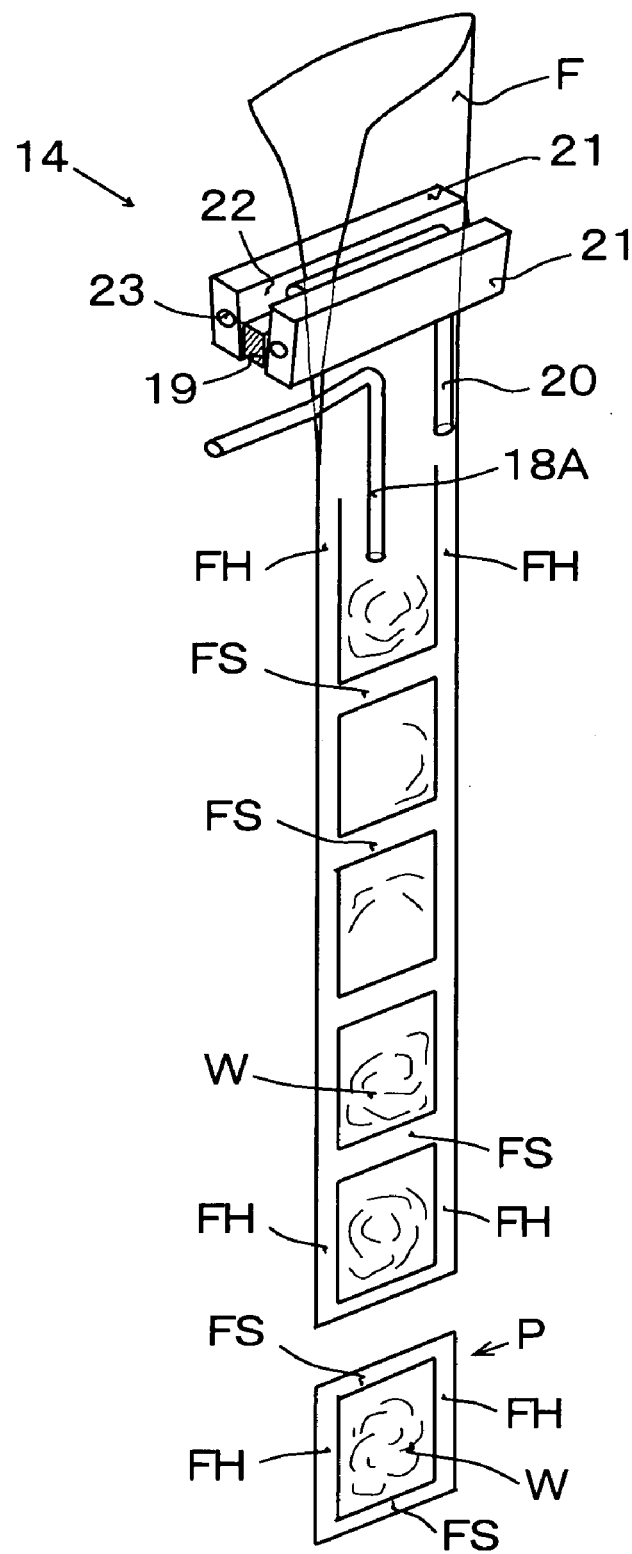
FIG. 4 is a schematic perspective view showing a film being formed into four-side-sealed packaging bags with the packaging and sealing of the bags done at the same time in the first embodiment.
Figure 7:
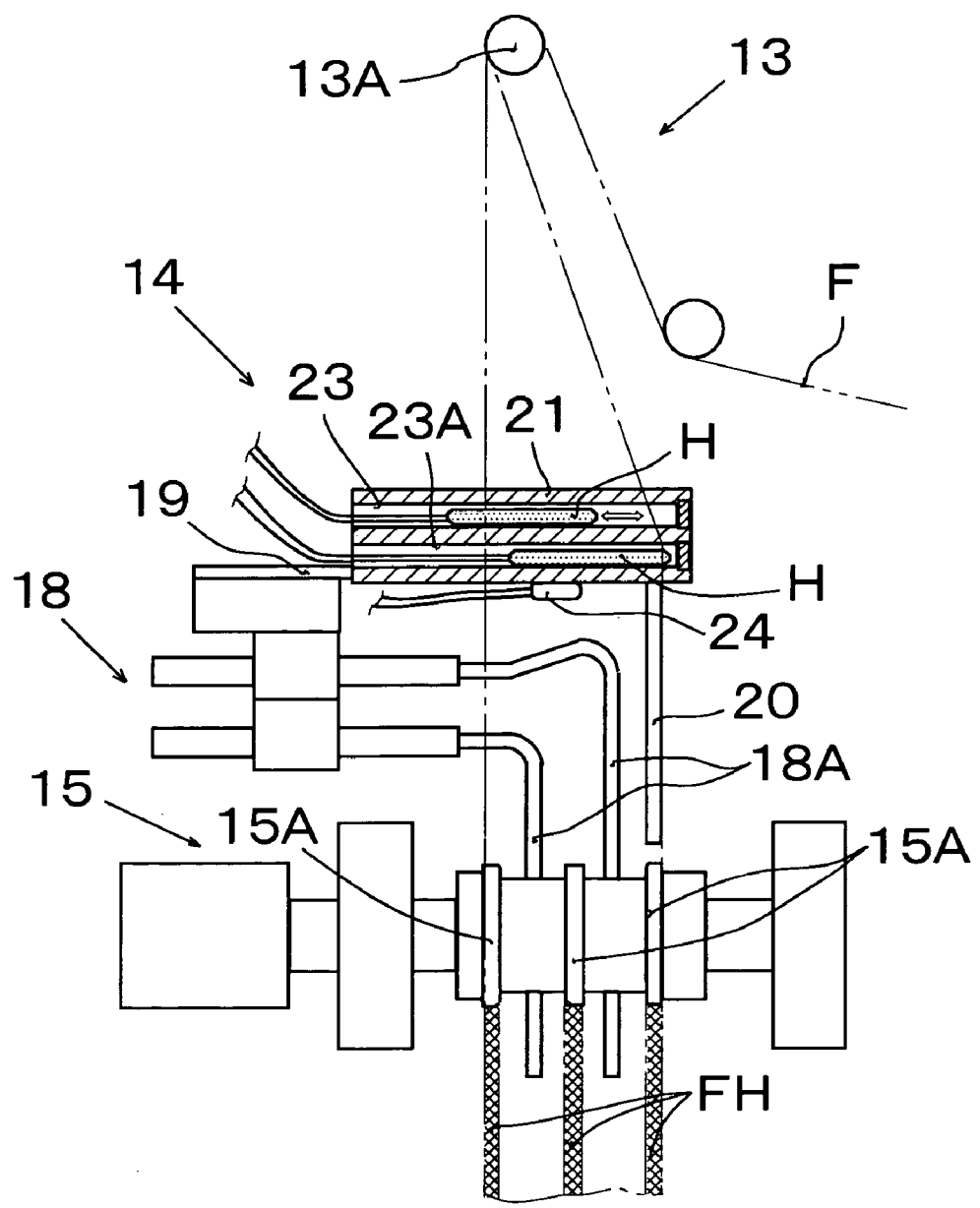
FIG. 7 is a front view showing in section the parts of principal portions of examples of preheating block members and heaters provided in the film folding mechanism in the present invention.

Examples of the preheating block members 21 and heaters H provided in the film folding mechanism 14 will be described. In the first embodiment, left and right preheating block members 21 are provided with a hollow 23 extending in the lengthwise direction thereof and in one portion of each thereof as shown in FIG. 3 etc., and one heater H is contained in each hollow 23 so that the heater can be moved therein for the regulation thereof. In the second embodiment, a hollow 23 is provided in one portion of the preheating block member 21 so that the hollow 23 extends in the lengthwise direction thereof as shown in FIG. 6, and two heaters H1, H2 are contained in this hollow so that both or one of the heaters H1, H2 can be moved for the regulation thereof, and in such a manner that the setting of the temperature or temperature distribution of the preheating means comes to be done conveniently. As shown in FIG. 7, the hollows 23, 23A are provided in upper and lower portions of a preheating block member 21 so that the hollows extend in the lengthwise direction of the block member 21, and a heater H is provided in each of the hollows 23, 23A so that each of the heaters H can be moved therein, and in such a manner that the setting of the temperature or temperature distribution of the preheating means can be done conveniently.

As shown in these examples, the portion of the film F which corresponds to the vertically sealing portion can be heated in a proper condition with the single or a plurality of heaters H, H1, H2 provided in the preheating block members 21, by switching a current supply condition (ON-OFF switching operation and the switching of the temperature setting operation by setting an applied current) in accordance with the material of the film F or the feed speed thereof. Since the temperature detecting unit (temperature detecting sensor 24) for measuring the temperature of the preheating block members 21 is provided, the film F can be heated in advance in accordance with the material of the film F, the thickness thereof and the feed speed thereof, to thereby enable the temperature setting to be done. It also becomes possible to vertically seal FH the film F to a proper sealing strength as the film F is held tightly between the vertically sealing rolls 15A, 15A used in the subsequent step.

Figure 8:
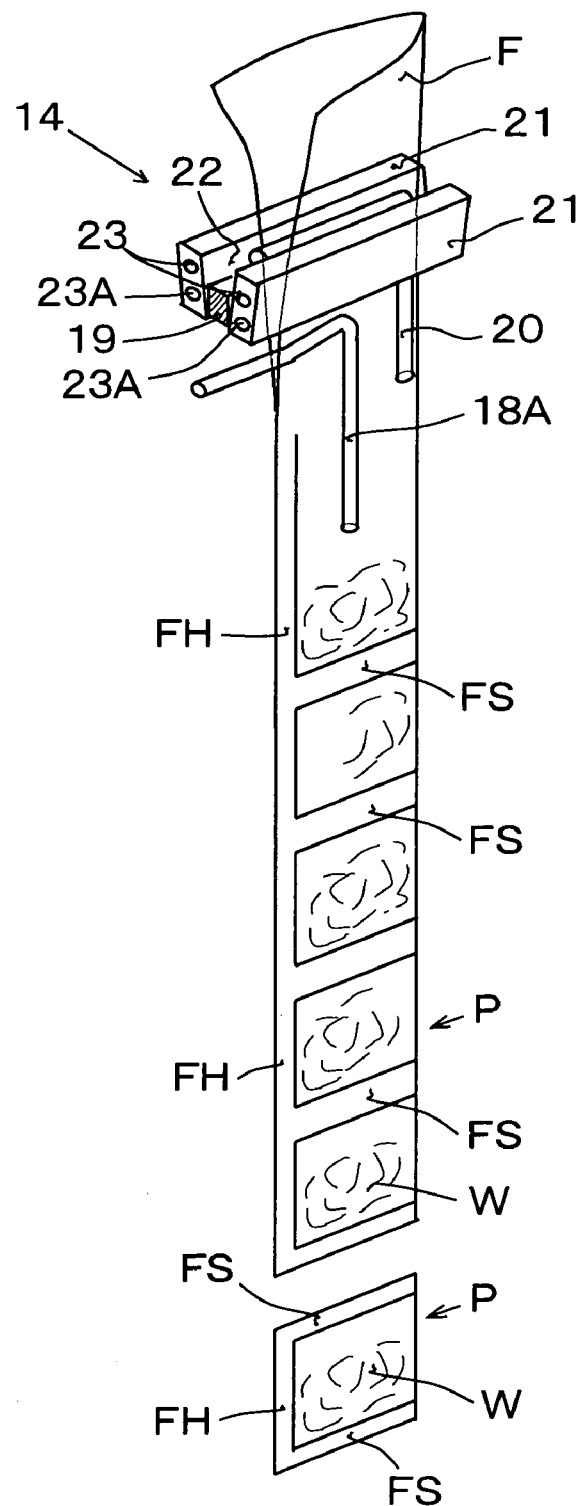
FIG. 8 is a schematic perspective view of three-side-sealed packaging bags in which a material is packaged with the bags made by the film folding mechanism in the present invention.
Figure 9:
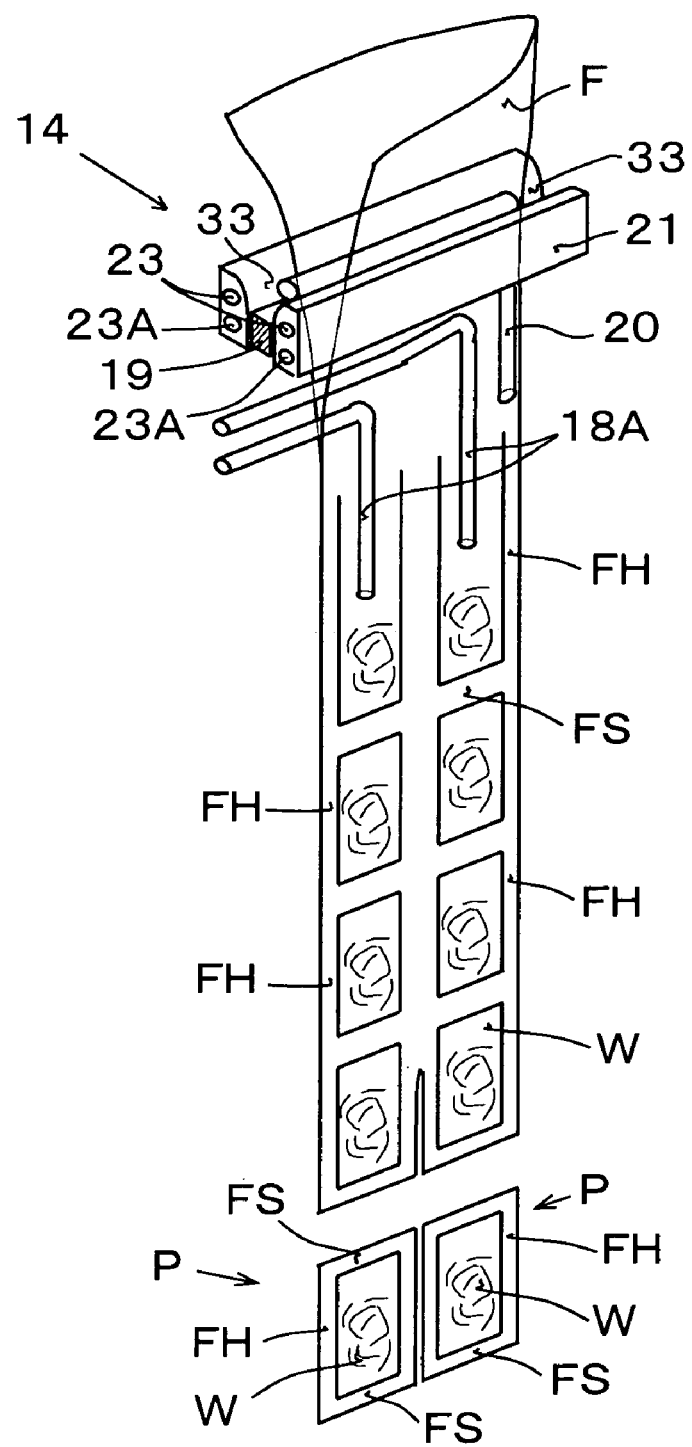
FIG. 9 is a schematic perspective view showing packaging bags made cylindrically in two vertical rows as the packaging film is withdrawn and guided in a twofold state by the film folding mechanism in the present invention.
Figure 10:
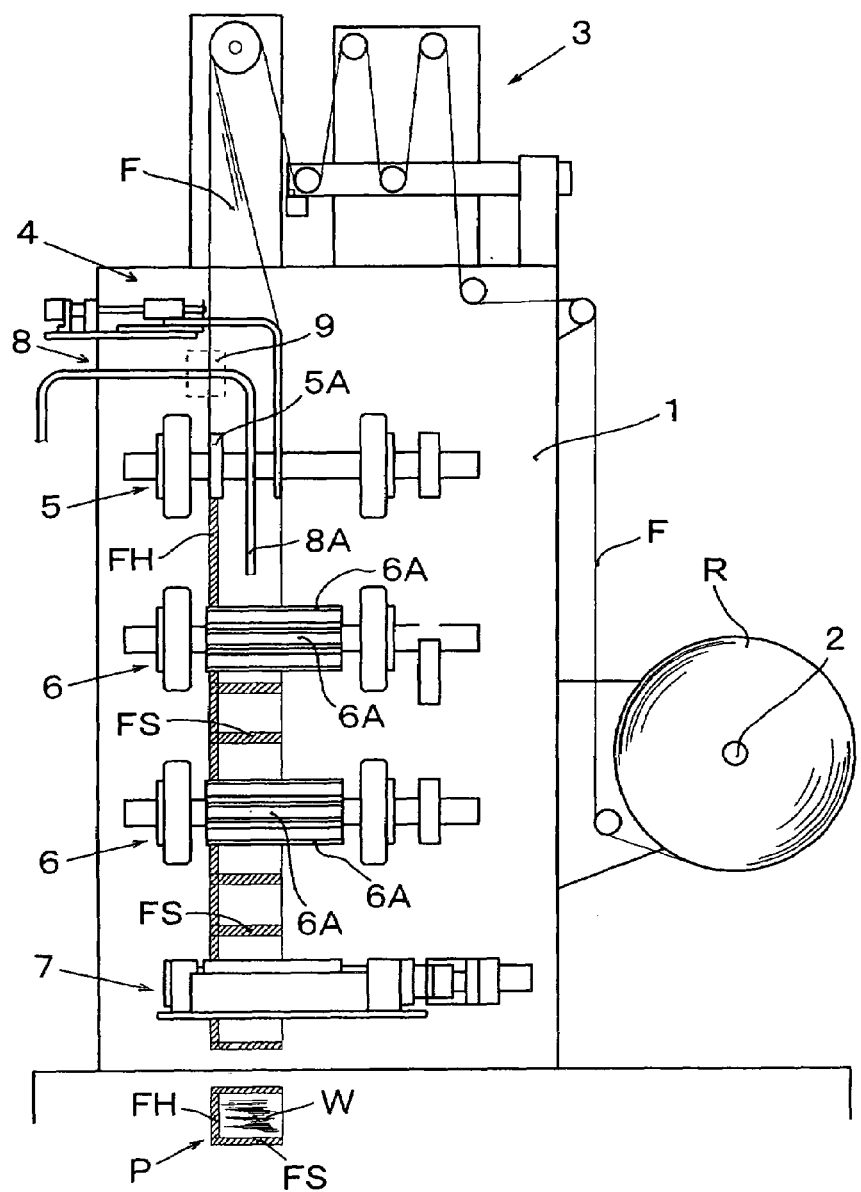
FIG. 10 is a general schematic front view of a related art filling and packaging machine.
Figure 11:
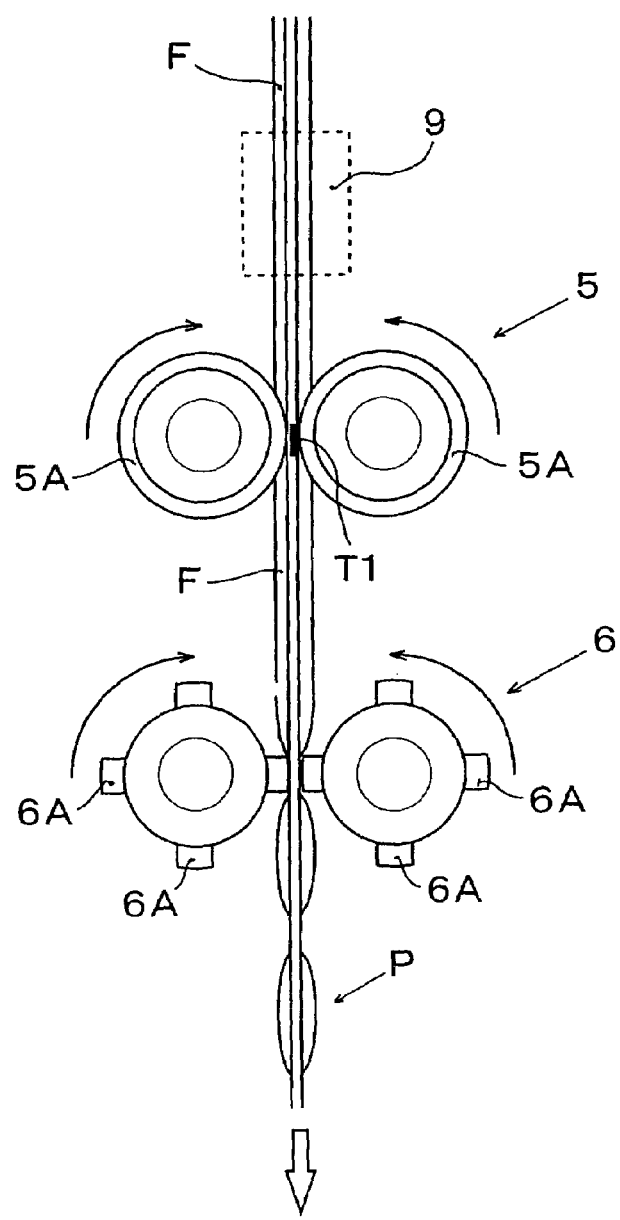
FIG. 11 is a side view of a principal portion, mainly a packaging film being heat sealed by the vertically sealing mechanism in the filling and packaging machine of FIG. 10.

The present invention is not limited to the above-described embodiments but can be modified variously within the scope of the gist of the invention. The four-side-sealed packaging bag P in the above-described embodiments constitutes an example formed by drawing and guiding one sheet of film F in a twofold state, heat sealing vertically FH the end section of the twofold portion and the edge sections (left and right edge sections) of the folded packaging film F by the vertical sealing rolls 15A, 15A provided in two positions in the vertical sealing mechanism 15, and thereby molding a vertically FH four-side-sealed packaging bag P at both ends. The present invention is advantageous in that the invention can be practiced by using a related art film folding mechanism 14, to which necessary and minimum partially simple parts which form a preheating mechanism (preheating block members 21 provided with inclined receiving surfaces 22 or arcuate receiving surfaces 33 etc., heaters H, temperature detecting sensors 24) and the like are added, in the methods of obtaining the following packaging bags. Molding packaging bags P by sealing three sides of a packaging film F as shown in, for example, FIG. 8. Molding two rows of cylindrically formed packaging bags P by drawing and guiding one sheet of packaging film F as the film F is folded in two, and vertically heat sealing a folded end section of the twofold film F and an intermediate section and folded edge sections (left and right edge sections and intermediate section) of the folded film F by three vertically sealing rolls of the vertically sealing mechanism as shown in FIG. 9. Molding a plurality of four-side-sealed lateral rows of packaging bags by using (not shown) vertically sealing rolls, which are provided in a vertically sealing mechanism, and laterally sealing rolls of a laterally sealing mechanism, and some other similar method.

In the first embodiment, preheating block members 21 provided in the film folding mechanism 14, made of a pair of rectangularly formed parts and having inclined receiving surfaces 22 at the side thereof which contact the film F are disposed diagonally as a means for increasing the contact surface area thereof with respect to the film F and heightening a preheating effect. The preheating block members 21 may be formed to a trapezoidal shape, and its inclined side surfaces may be formed as inclined receiving surfaces for the film F. In the second embodiment, the inclined receiving surfaces are formed as mere arcuate receiving surfaces 33. The radius of curvature of these surfaces may be varied. The arcuate surfaces may be formed so as to extend along an elliptic and a parabolic shapes. In short, the arcuate receiving surfaces may be set to a shape as long as the resultant receiving surfaces permit the efficiency of preheating the film F with the heat from the preheating block members 21 to be heightened by increasing the contact surface area of the block members 21 with respect to the film F, and as long as the receiving surfaces permit the film F to be preheated while rendering the efficiency of transfer of heat to the film F high.

As described in detail above, the present invention relates to a filling and packaging machine adapted to continuously form packaging bags of a film while packaging a material in the bags by carrying the steps of feeding out and guiding a film from a raw film roll made of a wound film; sending the film to a film folding mechanism adapted to fold back the film in two in the widthwise direction thereof; superposing the two parts of the folded film on each other, vertically sealing the film by a pair of vertically sealing rolls provided in an opposed manner in a vertically sealing mechanism and forming the film cylindrically at this vertically sealed portion; laterally sealing the cylindrically formed film by a pair of laterally sealing rolls provided in a laterally sealing mechanism, and forming a bottom portion of a packaging bag at this laterally sealed portion; filling a material into the film formed to a bottomed cylinder at the bottom portion; and laterally sealing a bag mouth portion of the film as the film is further fed, by the laterally sealing rolls of the laterally sealing mechanism to form a packaged bag and thereby carrying out a continuous packaging operation, wherein the film folding mechanism is provided with an inner surface guide member, which is adapted to guide the film in the widthwise direction thereof, on the side of inner surfaces of the twofold film, left and right preheating block members which are disposed on the side of outer surfaces of the film via clearances of a predetermined width left therebetween so that the preheating block members extend in the widthwise direction of the film, and which have inclined receiving surfaces or arcuate receiving surfaces so that the distance between the film and preheating block members at an upstream side with respect to the film transfer direction become larger than that between the film and preheating block members at a downstream side with respect to the same direction, and heaters provided in the interior of the preheating block members, the two heater-containing preheating block members provided in the film folding mechanism and having inclined receiving surfaces or arcuate surfaces so that the distances between the film and preheating block members at an upstream side with respect to the film transfer direction become larger than that between the film and preheating block members at a downstream side with respect to the same direction sending out the twofold film while holding the film tightly between the block members and pressurizing the same at the outer surface thereof in the widthwise direction of the film. Since the parts are arranged in this manner, the contact surface area of the film with respect to the two preheating block members can be increased, so that the film can be preheated as the heat transfer rate of the block members with respect thereto is rendered high. Since the film is sent out as a predetermined contact pressure thereof with respect to the preheating block members is maintained, the film can be heated in advance in a stable condition. Moreover, when the film is vertically sealed in a subsequent step as the film is held between a pair of vertical sealing rolls, the heat is transmitted easily to the thermally fusible resin layer of the film, so that this layer can be melted excellently. Therefore, even when the transfer speed of the film is increased, the sealed condition of the vertically sealed portion can be kept excellent, and the imperfect heat sealing of the portion to be vertically sealed can be prevented. During this time, the film can be preheated by utilizing a part of the film folding mechanism, which is adapted to fold the film in two, also as a preheater, and this enables the number of parts to be added to be reduced to as great an extent as possible. This enables a filling and packaging machine capable of attaining an object of the invention, and making up for a shortage of the quantity of heat occurring when a packaging film is heat sealed as the film is pressurized by at least a vertical sealing mechanism to be provided.

INDUSTRIAL APPLICABILITY

The present invention described above is suitably applied to a filling and packaging machine adapted to seal a material, such as a liquid, powder or a viscous material by vertically and laterally sealing three sides or four sides of a continuously fed packaging film, and, especially, to a preheating mechanism in a filling and packaging machine capable of making up for a shortage of the quantity of heat occurring while a packaging film folded and guided is heat sealed as the film is pressurized by a vertical sealing mechanism.

The invention claimed is:

1. A filling and packaging machine adapted to continuously form packaging bags from a film while packaging a material in the bags by carrying out the steps of drawing out and guiding a film from a raw film roll made of a wound film; sending this film to a film folding mechanism adapted to fold back the film in two in the widthwise direction; superposing the two parts of the folded film on each other, vertically sealing the film by a pair of vertically sealing rolls provided in an opposed manner in a vertically sealing mechanism and forming the film cylindrically at this vertically sealed portion; laterally sealing the cylindrically formed film by a pair of laterally sealing rolls provided in a laterally sealing bag at this laterally sealed portion; filling a material into the film formed to a bottomed cylinder at the bottom portion; and laterally sealing a bag mouth portion of the film as the film is further fed, by the lateral sealing rolls of the laterally sealing mechanism to form a packaged bag and thereby carrying out a continuous packaging operation, characterized in that the film folding mechanism is provided with a inner surface guide member, which is adapted to guide the film in the widthwise direction thereof, on the side of inner surfaces of the twofold film, left and right preheating block members which are disposed on the side of outer surfaces of the film via clearances of a predetermined width left therebetween so that the preheating block members extend in the widthwise direction of the film, and which have inclined receiving surfaces so that the clearances between the film and preheating block members at an upstream side with respect to the film transfer direction become larger than those between the film and preheating block members at a downstream side with respect to the same direction, and heaters provided in the interior of the preheating block members.

2. A filling and packaging machine according to claim 1, wherein the two preheating block members are provided so that the fixing angle of the inclined receiving surfaces thereof can be finely regulated.

3. A filling and packaging machine according to claim 1, wherein the positions in which the two preheating block members are fixed can be vertically regulated.

4. A filling and packaging machine according to claim 1, wherein the distance between the two preheating block members can be regulated.

5. A filling and packaging machine adapted to continuously form packaging bags from a film and continuously packaging a material in the bags by carrying out the steps of drawing out and guiding a film from a raw film roll made of a wound film; sending the film to a film folding mechanism adapted to fold back the film in two in the widthwise direction; superposing the two parts of the folded film on each other, vertically sealing the film by a pair of vertically sealing rolls provided in an opposed manner in a vertically sealing mechanism and forming the film cylindrically at this vertically sealed portion; laterally sealing the cylindrically formed film by a pair of laterally sealing rolls provided in a laterally sealing mechanism, and forming a bottom portion of a packaging bag at the laterally sealed portion; filling a material into the film formed to a bottomed cylinder at the bottom portion; and laterally sealing a bag mouth portion of the film as the film is further fed, by the laterally sealing rolls of the laterally sealing mechanism to form a packaged bag and thereby carrying out a continuous packaging operation, characterized in that the film folding mechanism is provided with an inner surface guide member, which is adapted to guide the film in the widthwise direction thereof, on the side of inner surfaces of the twofold film, left and right preheating block members which are disposed on the side of outer surfaces of the film via clearances of a predetermined width left therebetween so that the preheating block members extend in the widthwise direction of the film, and which have arcuate receiving surfaces so that the clearances between the film and preheating block members at an upstream side with respect to the film transfer direction become larger than those between the film and preheating block members at a downstream side with respect to the same direction, and heaters provided in the interior of the preheating block members.

6. A filling and packaging machine according to claim 5, wherein the radius of curvature of the arcuate receiving surfaces provided on the two preheating block members is arbitrarily set.

7. A filling and packaging machine according to claim 5, wherein the two preheating block members are provided so that the positions in which the preheating block members are fixed can be vertically regulated.

8. A filling and packaging machine according to claim 5, wherein the two preheating block members are provided so that the distance therebetween can be varied.

* * * * *